J. J. STALDER.
CULTIVATOR TOOTH.
APPLICATION FILED NOV. 22, 1909.
1,073,642.
Patented Sept. 23, 1913.
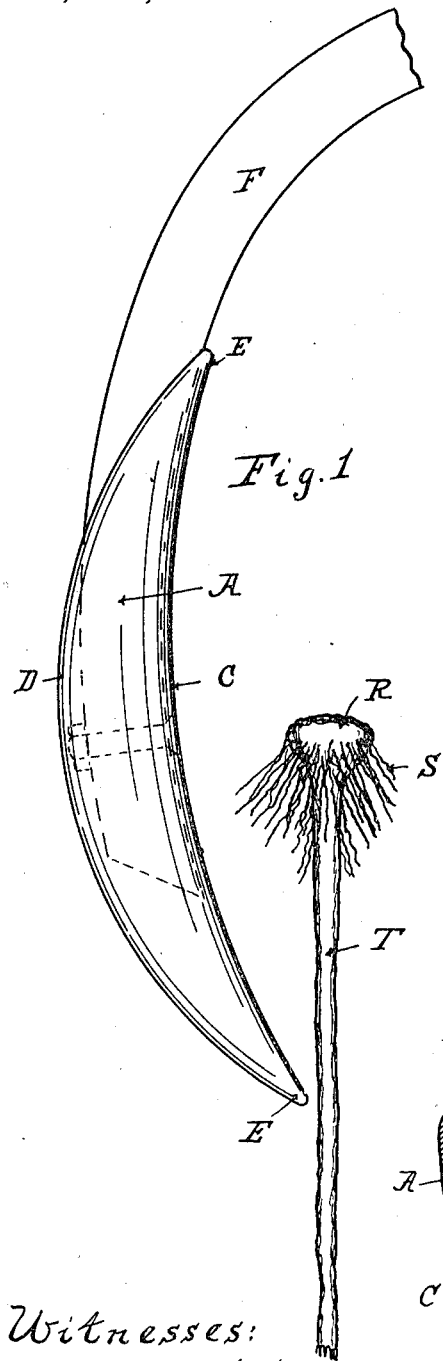
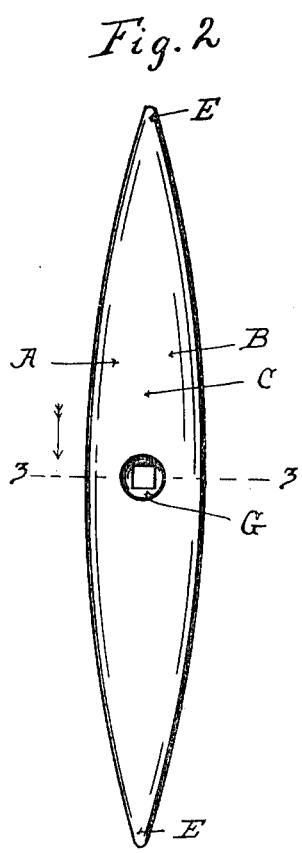
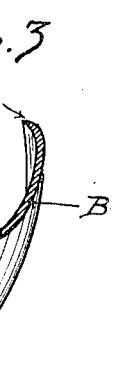
Witnesses:
A. W. Macomber
G. W. Benson
Inventor:
John J. Stalder,
By A. W. Macomber
Atty

UNITED STATES PATENT OFFICE.

JOHN J. STALDER, OF MEADE, KANSAS.

CULTIVATOR-TOOTH.

1,073,642.

Specification of Letters Patent.  Patented Sept. 23, 1913.

Application filed November 22, 1909. Serial No. 529,288.

*To all whom it may concern:*

Be it known that I, JOHN J. STALDER, a citizen of the United States, and a resident of Meade, in the county of Meade and State of Kansas, have invented certain new and useful Improvements in Cultivator-Teeth, of which the following is a specification.

My invention is an improvement in alfalfa cultivator teeth, and consists in certain novel constructions and combinations of parts, hereafter described and claimed.

The object of the invention is to provide a tooth with a rounded nose or rounded extremity and a non-cutting edge especially adapted for cultivating plants without cutting the roots thereof and which will lift the grass and the weeds from the soil without injuring the roots of the plants under cultivation.

The invention is, therefore, a novel form of cultivator tooth for getting into the ground among plants generally sown broadcast, and incapable of cultivation without injury by the use of any cultivator tooth as previously constructed.

Referring to the drawings forming a part hereof, Figure 1 is a side elevation of my cultivator tooth secured to a drag beam showing the improvement, Fig. 2 is a front elevation of the tooth, and Fig. 3 is a section of the same on the line 3—3 of Fig. 2.

The embodiment of the invention as shown in the drawings is formed from a plate of suitable metal, having its greatest width at its center, and gradually decreasing in width toward the extremities where it is formed with rounded noses, the edges however, being blunt and rounded, and turned backwardly and inwardly so as to present no edge whatever to come in contact with the roots of a plant.

The plate is doubled upon itself longitudinally to form the sides A and B diverging from the center C toward the free edges D. The plate is substantially elliptical in shape in front elevation and of substantially crescent shape in side elevation, and when so bent a rounded nose E is formed at the extremity of each end.

Longitudinally the front of the plate is concaved, as clearly shown in Fig. 1, for two purposes: First to give the tooth the necessary lead to keep it in the ground. Second, for the more important purpose of having the operating nose E in advance of the body so as to be deflected by a tap-root and so that the rounded sides will slide past the plant without injury to it. For it is well known to those familiar with alfalfa and similar tap-rooted plants that the tap-root is woody and hard and will readily deflect the nose of a tool having side-play without injury to the root. This condition and operation is clearly shown in Fig. 1. As the rounded extremity of the nose of the point E strikes the tap-root T, it will be deflected so that the rounded side A or B, as the case may be, will slide past the plant without breaking the crown roots S or abrading the crown R, which lies at the surface of the ground.

The improved teeth are secured to the drag-beams F by means of bolts whose heads fit the counter-sunk portion of the opening G, the outer faces of the heads being flush with the face of the teeth. The edges D of the teeth are inturned toward each other and non-cutting and are rounded as shown more particularly in Fig. 3, the entire contacting sides of the teeth being rounded as shown.

The improved tooth is especially designed for the cultivation of alfalfa, wherein it is necessary that the crown of the plant should not be cut from the root, the foreign plants being merely lifted from the soil without disturbing the alfalfa. For this reason the tooth is devoid of any sharp edges and of any corners, the edge being, as above stated, inturned and entirely out of line of contact. The extremities E are blunt, providing rounded noses, as shown in Figs. 1 and 3, and it is evident that, since the ends of the teeth are alike, it is reversible, either nose being capable of use; but it will be understood that this double-nose construction is a matter of desirability and not a necessity.

I claim:

1. A cultivator tooth formed from a substantially elliptical plate having a continuous non-cutting rounded edge extending from end to end, the said plate being bent upon its long axis to form oppositely arranged rounded sides and teeth having noses formed with rounded extremities, the sides diverging toward the free edges of the plate, the said plate being concaved longitudinally presenting a crescent shape and having means at its center whereby it may be attached to a support with either nose in operative position.

2. A cultivator tooth consisting of a crescent-shaped member which is approximately of U-shape in cross-section, the side portions of said member being rounded and the edge portions of said member being rounded and inturned toward each other and the ends of said member being formed with noses having rounded extremities so that the tooth will loosen the soil around a plant without liability of cutting the plant.

3. A cultivator tooth provided with an intermediate portion that is adapted to be connected to a drag beam which carries the tooth, and crescent-shaped side portions which flare outwardly and downwardly from said intermediate portion, said side portions converging at the ends of the tooth into blunt noses having rounded extremities and the edges of said side portions being rounded so that the tooth will loosen the soil around a plant without liability of cutting the roots of the plant.

4. A cultivator tooth for cultivating alfalfa and like tap-root plants, having its working portion curved forwardly and terminating in a rounded nose, the extremity of which is rounded upon short radius curves which are adapted to come in contact with and to be deflected by the tap-root of a plant in advance of the body of said tooth coming in contact with a plant; and the sides of said tooth being curved rearwardly to present a rounded and smooth surface, and the edges bent inwardly toward each other and entirely out of line or plane of contact with such plant.

5. A cultivator tooth for cultivating alfalfa and like tap-root plants having its working part curved forwardly and terminating in a rounded nose having a rounded extremity adapted to pass beneath the crown roots and to contact with and be deflected by the tap-roots of the plants in advance of the body of the tooth.

6. A cultivator tooth for cultivating alfalfa and like tap-root plants having its working part curved forwardly and terminating in a rounded nose having a rounded extremity adapted to pass beneath the crown roots and to contact with and be deflected by the tap-roots of the plants in advance of the body of the tooth, and the sides of the tooth curved rearwardly and having their edges inturned toward each other.

JOHN J. STALDER.

Witnesses:
LOUIS BOEHLER,
R. A. HARPER.